Jan. 13, 1953 W. E. HAPPEL 2,624,985
WORK LOADING DEVICE FOR MACHINE TOOLS
Filed Jan. 5, 1950 4 Sheets-Sheet 4
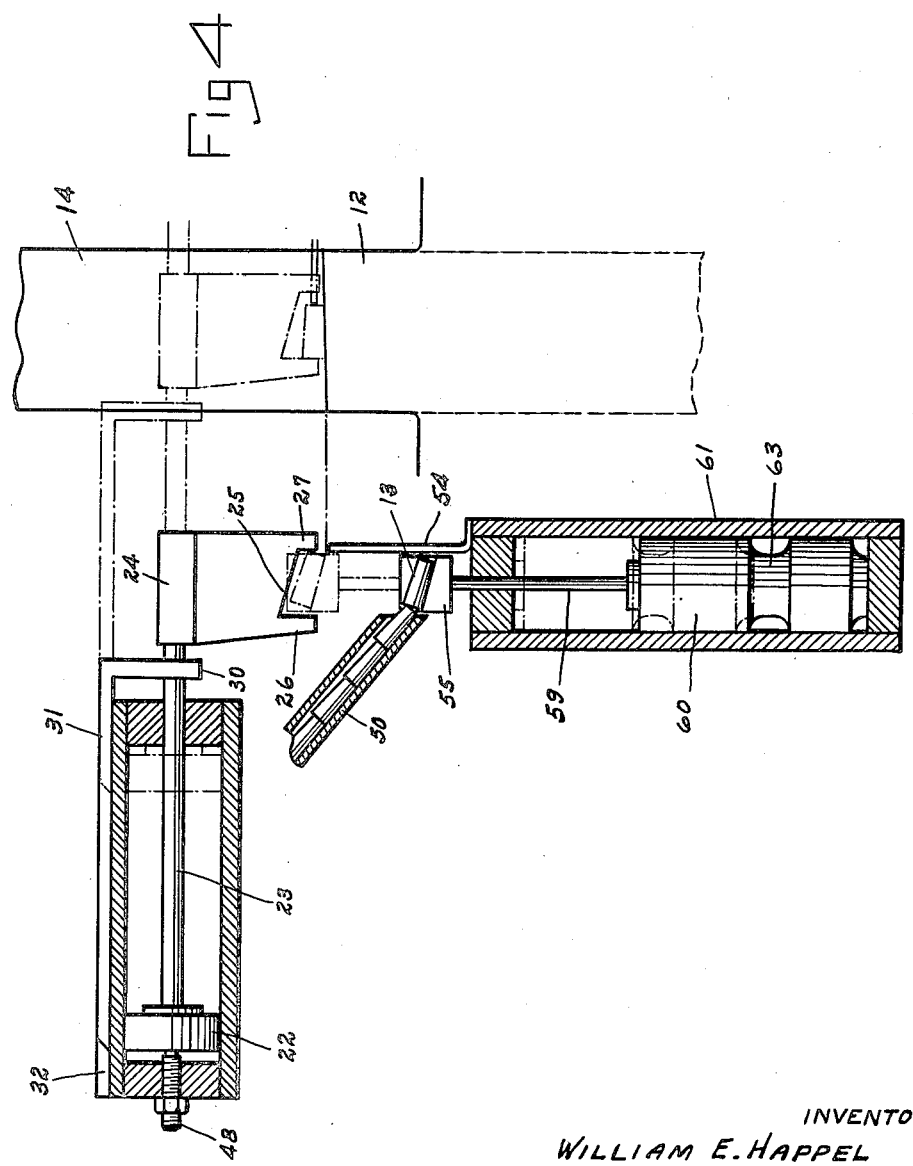
INVENTOR
WILLIAM E. HAPPEL
BY
Hugh N Rocke
ATTORNEY Patented Jan. 13, 1953

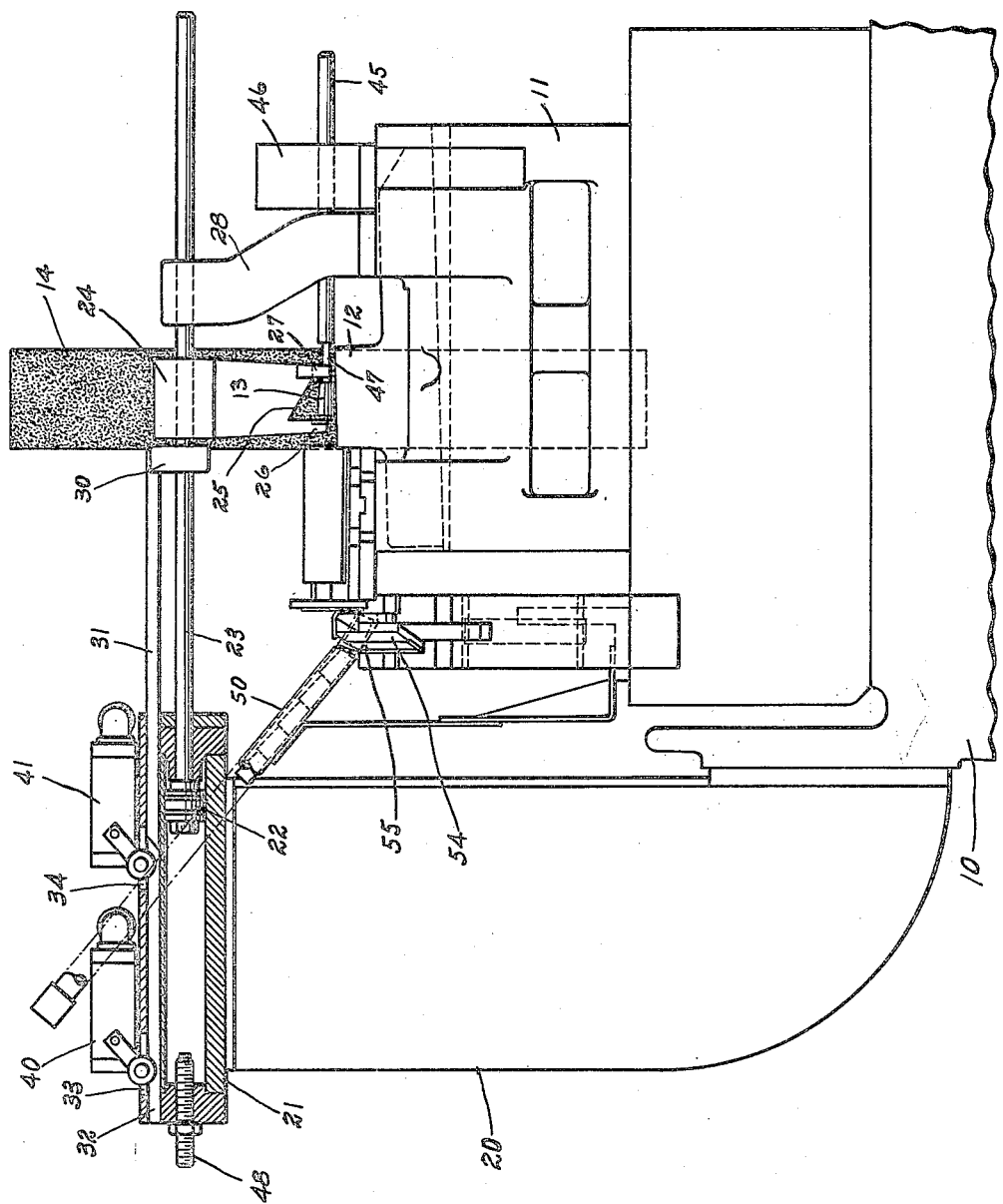

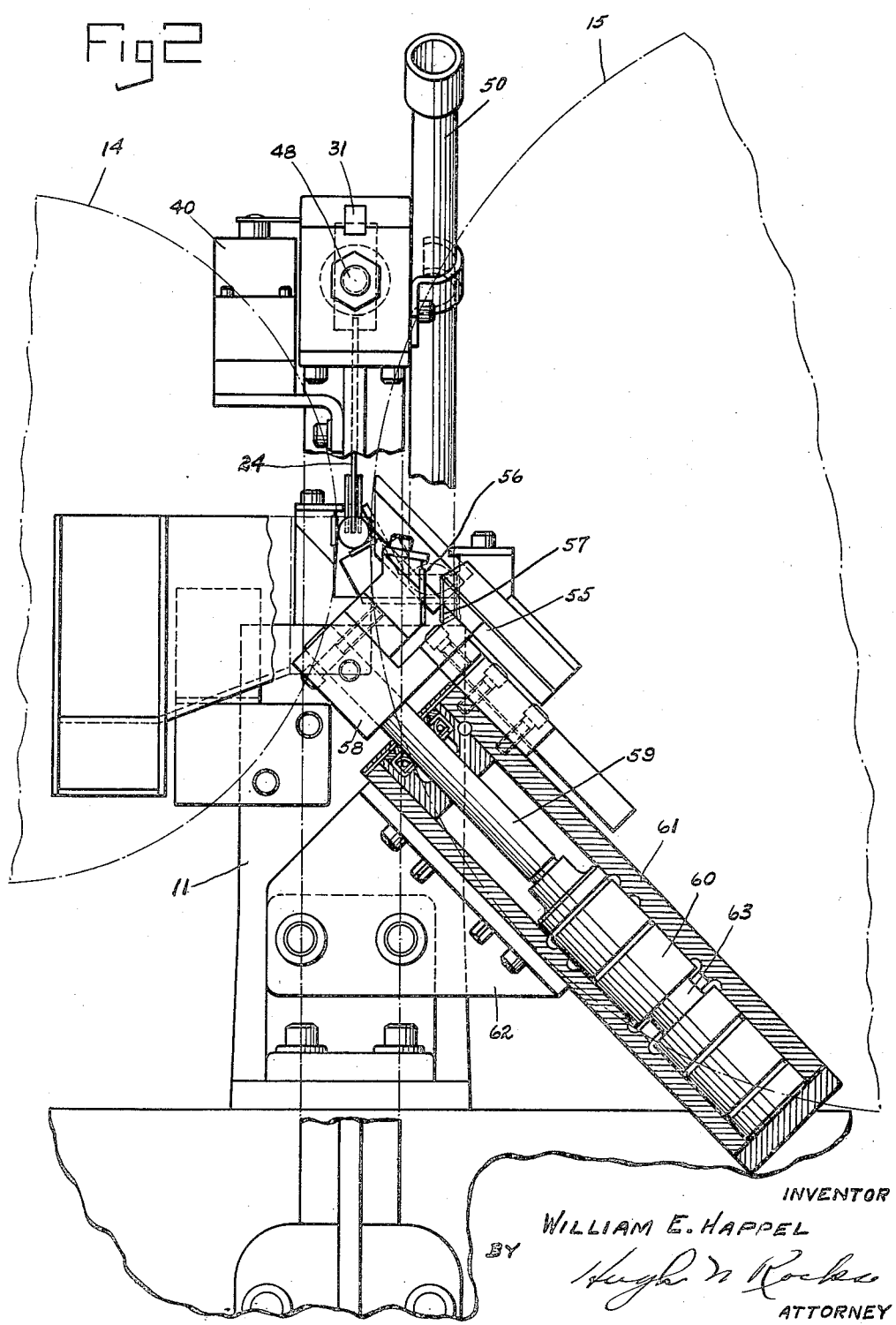

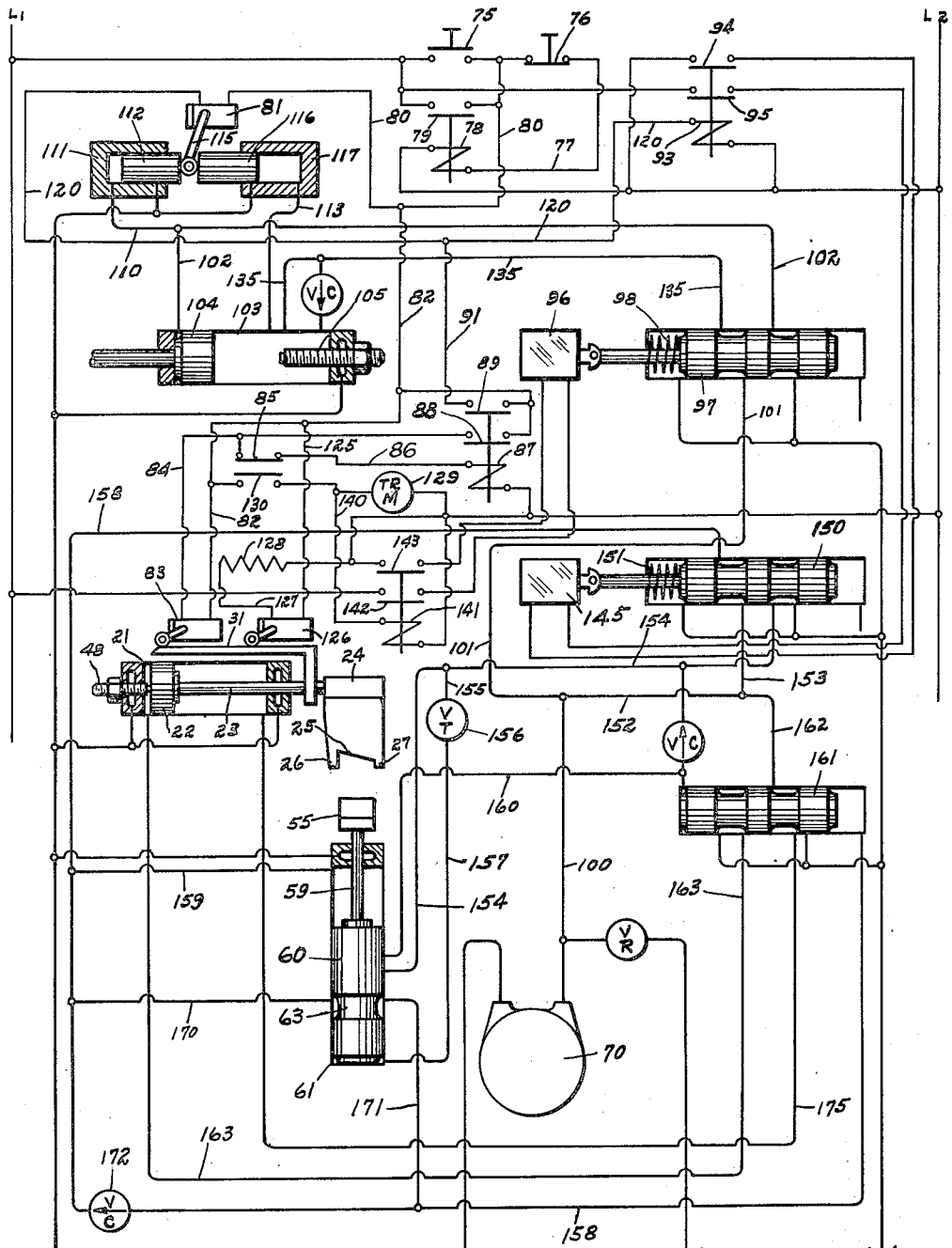

2,624,985

UNITED STATES PATENT OFFICE 2,624,985

WORK LOADING DEVICE FOR MACHINE TOOLS

William E. Happel, Waynesboro, Pa., assignor to Landis Tool Company, Waynesboro, Pa.

Application January 5, 1950, Serial No. 136,907

7 Claims. (Cl. 51—103)

This invention relates to work loading and ejecting apparatus for machine tools, particularly for centerless grinders, for loading and ejecting cylindrical or non-cylindrical work pieces, such as tapered rollers or work pieces having more than one diameter, particularly where it is necessary or desirable that the work be loaded and ejected in an axial direction.

The usual method for performing this operation consisted in delivering the work to a position in axial alignment with the grinding position by means of a chute or other suitable apparatus. From this position, the work was moved axially into the grinding throat by means of either a pushing device which moved the work into position against a stop which later served to eject the work, or by a slotted device which engaged both ends of the work, carrying it into grinding position and reversing its movement to carry the work out of the grinding throat after the grinding operation had been completed. When removing the work by this latter method, the work piece had to be moved beyond the end of the chute in order that it could be discharged, either by gravity or otherwise, from the machine. The empty carrier would then return to a position in front of the chute where it would stop while an unground piece was released from the chute into operative relation with said carrier. The carrier would then carry the work piece into grinding position. By eliminating time required to carry the ground piece beyond the chute to the discharge point and returning to the loading position, the cycle time for each piece can be reduced considerably.

It is, therefore, an object of this invention to provide means for loading work pieces into a centerless grinder and removing them therefrom with a minimum of handling time.

A further object is to provide means for placing the work piece in alignment with the grinding throat at a position spaced axially from said grinding position by a predetermined amount and to discharge the finished work piece in the same position.

In the drawings, Figure 1 is an end elevation, looking toward the control wheel.

Figure 2 is a front elevation, partly in section, and showing the means for moving the work piece from the chute to a position in line with the grinding throat.

Figure 3 is a combined piping and wiring diagram for the various hydraulic and electrical apparatus for operating the loading device.

Figure 4 shows the position of the various parts at different points in the operating cycle.

This loading and ejecting apparatus is shown mounted on a machine of the type disclosed in Patent No. 2,419,940, granted May 6, 1947. The feeding mechanism for moving the grinding wheel toward and away from grinding position is similar to that disclosed in co-pending application Ser. No. 46,280, filed August 26, 1948, now Patent No. 2,571,610.

In Figure 1, numeral 10 indicates the bed of a centerless grinder; 11, a work rest base mounted on said bed; 12, a work rest blade mounted on said base and having the work supporting surface thereof tapered downwardly from right to left for supporting a work piece 13 thereon between control wheel 14 and grinding wheel 15. Said grinding wheel is indicated in Figure 2, but not in Figure 1. The means for moving the work piece 13 into and out of the grinding throat includes a bracket 20 attached to the front of the bed 10. On top of said bracket is a cylinder 21 in which a piston 22 is slidably mounted. A piston rod 23 extends from the right-hand end of said piston and supports a bracket 24 having a slotted depending portion 25 which provides spaced fingers 26 and 27, between which a work piece is introduced by means to be described later and loaded into the grinding throat. Also mounted on piston rod 23 is a collar 30 to which is attached cam bar 31 which extends back to cylinder 21 and passes through an axial bore 32 in the wall of said cylinder. Axially spaced slots 33 and 34 in the wall of said cylinder permit the contact rollers of normally open switches 40 and 41 to extend into the path of cam bar 31. The outer end of piston rod 23 is supported by bracket 28 mounted on work rest base 11.

The means for locating the work in the grinding throat consists of a stop bar 45 supported in a bracket 46 and work rest base 11. The inner end 47 of said rod 45 is of a reduced diameter and passes through a slot in fingers 27 in order to engage and locate work piece 13. The length of travel of piston 22 may be adjusted by means of screw 48 in the head end of cylinder 21.

Work pieces are conducted to the machine through a chute 50, at the lower end of which is a work receiving device 55 having a work supporting portion inclined at an angle substantially the same as that of the chute 50. Said work receiving device has a pair of work supporting surfaces 56 and 57. Work receiving device 55 is secured by means of a bracket 58 to a piston rod 59 of piston 60. Plate 54 holds work in tube while carrier 55 is in the upper position. Piston 60 is slidably mounted in a cylinder 61, which in turn is mounted by means of a bracket 62 to the work rest base 11. Bracket 62 supports cylinder 61 at an angle so that the work receiving device moves upwardly after receiving the work piece from chute 50. A groove 63 in piston 60 permits said piston to act as a valve, the function of which will be described later.

Operation

Assuming that pump 70, which supplies fluid under pressure to the various hydraulic mechanisms, is already in operation, the grinding cycle is initiated by closing push button switch 75 to complete a circuit between L-1, stop switch 76, and line 77 to energize the coil of relay 78 and close contact 79 of said relay. Contact 79 completes a circuit from L-1 through line 80 to limit switch 81, which is shown in open position.

Contact 79 of relay 78 also closes a circuit through line 80 and line 82 to normally open limit switch 83, shown in closed position. From said limit switch, the circuit passes through line 84, timer contact 85, line 86 to energize the coil of relay 87. Contact 88 of relay 87 provides a holding circuit. Contact 89 completes a circuit from line 82 through lines 90 and 91 to energize the coil of relay 93. Contacts 94 and 95 of relay 93 complete a circuit to solenoid 145. Solenoid 145 shifts valve 150 to the left against spring 151 and connects pressure supply line 153 with line 154. Line 154 is blocked because of the position of piston 60. Fluid, therefore, passes through line 155, throttle valve 156, and line 157 to the lower end of cylinder 61, moving piston 60 and carrier 55 upwardly and carrying a work piece 13 into position in alignment with the grinding throat. As work piece 13 and carrier 55 move past tube 50, said work piece 13 gives the work pieces in the tube slight upward movement. This helps to keep the work from sticking to the tube. In the upper position of piston 60, groove 63 therein connects line 154 with line 160 to direct fluid under pressure to the left end of pressure operated reversing valve 161, shifting said valve to the right. Valve 161 connects pressure supply line 162 with line 163, leading to the left end of cylinder 21, shifting piston 22 and loader member 25 to carry the work piece 13 into the grinding throat.

As piston 22 moves to the right, cam bar 31 releases switch 83 to open the circuit therethrough. It also releases switch 126 to close the circuit therethrough.

Opening switch 83 has no effect on relay 87, which is held through its own contact 88 from lines 82 and 90.

Releasing normally closed limit switch 126 closes a circuit from line 82 and line 125 to line 127 and time clutch 128, starting the timing cycle. When the cycle starts, timer contact 130 is closed; and contact 85, which was originally closed, remains closed. Closing contact 130 completes a circuit from line 82 through line 140 to the coil of relay 141 and to timer motor 129, initiating timing period. Contacts 142 and 143 of said relay energize solenoid 96, shifting valve 97 to the left against spring 98. With valve 97 in the left-hand position, fluid under pressure from line 101 is directed through line 102 to the left end of cylinder 103. Fluid from line 102 is also directed from line 110 to the left end of cylinder 111 to shift piston 112 to the right and close pressure switch 81. This completes a second circuit from line 80 through line 120 to the coil of relay 93.

When the fluid enters the left end of cylinder 103, piston 104 moves toward the right to feed grinding wheel 15 for a grinding operation. The grinding operation continues until timer 129 times out, opening both contacts 85 and 130. Opening contact 85 deenergizes the coil of relay 87 and opens contact 89 leading to the coil of relay 93. However, relay 93 remains energized from the circuit through limit switch 81, which was closed when the wheelbase began to move forward. Therefore, the pistons 22 and 60 remain in the position which they have held during the grinding operation.

Opening timer contact 130 deenergizes the coil of relay 141, opening contacts 142 and 143 to deenergize feed solenoid 96. Spring 98 then moves valve 97 to the right, connecting fluid supply line 101 with line 135 leading to the right-hand end of feed cylinder 103. Piston 104 begins to move to the left to withdraw grinding wheel 15 from grinding position. After said piston has moved a short distance, it opens line 113 to permit the passage of fluid under pressure to cylinder 117, shifting piston 116 to the left to open pressure switch 81.

Opening pressure switch 81 breaks a circuit to the coil of relay 93, opening contacts 94 and 95 to deenergize solenoid 145 and permit spring 151 to shift valve 150 to the right. With valve 150 in the right-hand position, fluid under pressure from line 153 is connected to line 158, from which it passes through line 159 to the upper end of cylinder 61, shifting piston 60 to its lower position and removing the work receiving device from its position in alignment with the grinding throat. Line 158 also leads to the right-hand end of pressure valve 161. However, movement of fluid in that direction is prevented by check valve 172. With piston 60 in its lower position, fluid from line 158 may by-pass check valve 172 through line 170 through groove 63 in piston 60 and line 171 back to line 158 to the right-hand end of valve 161. Valve 161 is then shifted to the left, connecting fluid supply 162 with line 175, leading to the right-hand end of cylinder 21. Piston 22 is then moved to the left, bringing with it loader member 25 and the finished work piece 13. Since work receiving member 55 has been removed from its position in alignment with the grinding throat, there is an open space under the work pieces at this point; and the work drops by gravity into a receiving chute, not shown.

When piston 22 moves to the left, cam bar 31 actuates switches 83 and 126, opening switch 126 and closing switch 83. Opening switch 126 deenergizes timer clutch 128, ending the cycle so far as the timer is concerned. Closing switch 83 initiates a new cycle by actuating the loading valve 150 as described previously when piston 60 moves upwardly at the beginning of the new cycle, carrying another unground work piece. If the previously finished piece has not, for any reason, been removed from the loader member 25, the movement of the new piece into position will effect such removal.

Figure 4 shows a diagrammatic representation of the loading cycle. The work pieces 13 move by gravity from tube 50 into an inclined slot in carrier 55. Carrier 55 takes the work to position between the end portions of the slotted member 27. Said member is moved endwise into the grinding throat, carrying with it the work piece to position it between the grinding and regulating wheels. At the end of the grinding operation, carrier 55 is withdrawn to position to receive another piece from tube 50. Loader member 27 cannot be reversed until carrier 55 has been withdrawn. When loader member is reversed and returns to the starting position with the finished ground work piece, the absence of carrier 55, which previously supported the work piece in this position, permits the work piece to drop from loader 27 into a chute or other suitable work receiving member. Thus, work pieces are loaded and discharged in the same axial position.

I claim:

1. In a centerless grinding machine having peripherally opposed grinding and control wheels, a work rest for supporting a work piece in operative relation to said wheels, means for introducing a work piece into the grinding throat formed by said wheels and said work rest and removing same therefrom after a grinding operation, including guide surfaces adjacent said work rest for guiding said work piece into said grinding throat, a chute for conducting work pieces to a position offset from said work rest, means having work supporting surfaces corresponding to said guide surfaces for receiving work pieces from the chute, carrying it in a lateral direction to and holding it in alignment with said work rest, means operable thereafter for moving said work piece axially from said carrying means and placing it in operative position in said grinding throat, means for effecting a feeding action of one of said wheels after said work has been placed in grinding position, means for returning said carrying means to work receiving position before a finished work piece is removed from said grinding throat, and means for thereafter reversing said axially moving means for removing the work piece from the grinding throat to the position previously occupied by said carrying means whereby said work piece is removed from said axially moving means by gravity.

2. In a centerless grinding machine having peripherally opposed grinding and control wheels, a work rest for supporting a work piece in operative relation to said wheels, means for introducing a work piece into the grinding throat formed by said wheels and said work rest and removing same therefrom after a grinding operation, including a chute, means for receiving a work piece from said chute, carrying it in a lateral direction to, and holding it in alignment with, said work rest, means operable thereafter for moving said work piece axially from said carrying means and placing it in operative position in said grinding throat, means for returning said carrying means to work receiving position before a finished work piece is removed from said grinding throat, and means operable at the end of a grinding operation for reversing said axially moving means for removing the work piece from the grinding throat to the position previously occupied by said carrying means whereby said work piece is removed from said axially moving means by gravity.

3. In a centerless grinding machine having peripherally opposed grinding and control wheels, a work rest for supporting a work piece in operative relation to said wheels, means for introducing a work piece into the grinding throat formed by said wheels and said work rest and removing same therefrom after a grinding operation, including transfer means for receiving a work piece and shifting it laterally and upwardly into alignment with said work rest, means having an open slot for engaging only the ends of a work piece for moving said work piece axially from said transfer means and placing it in an operative position in said grinding throat, means for returning said transfer means to work receiving position before a finished work piece is removed from said grinding throat, and means operable at the end of a grinding operation for reversing said axially moving means for removing the work piece from the grinding throat means for stopping said axially moving means in the position previously occupied by said transfer means whereby said work piece may drop from said open slot into said space.

4. In a centerless grinding machine having peripherally opposed grinding and control wheels, a work rest for supporting a work piece in operative relation to said wheels, means for effecting a feeding movement of one of said wheels toward the other means for loading a work piece into the grinding throat formed by said wheels and said work rest and removing same therefrom after a grinding operation, including means for receiving a work piece and positioning it in alignment with said work rest, means for moving said work piece axially from said receiving means and placing it in operative position in said grinding throat, a timing mechanism, means actuated by said axially moving means for initiating operation of said timing mechanism to start said feeding means for feeding one of said wheels toward the other to grind a work piece and after a predetermined time to withdraw said wheel to inoperative position, and means operable when said wheel is withdrawn for initiating operation of said loading means.

5. In a centerless grinding machine having opposed grinding and control wheels, a work rest for supporting a work piece in operative relation to said wheels, means for effecting a feeding movement of one of said wheels toward the other means for loading a work piece into the grinding throat formed by said wheels and said work rest and removing same therefrom after a grinding operation, means for receiving a work piece and placing it in alignment with said work rest, means for moving said work piece axially from said receiving means and placing it in operative position in said grinding throat, a timing mechanism, means actuated by said axially moving means for initiating operation of said timing mechanism, thereby starting said feeding means for feeding one of said wheels toward the other to grind a work piece, and after a predetermined time, to initiate withdrawal of said wheel to inoperative positon, said timing means being operable at the end of a grinding operation for reversing said axially moving means for removing the work piece from said grinding throat, said reversing movement of said axially moving means being effective to stop said timing mechanism.

6. The combination with a centerless grinder including opposed grinding and regulating wheels and an intermediate work rest, means including a transfer device for receiving work pieces from a supply thereof and for elevating same to a loading and discharging position in alignment with said work rest, and thereafter descending to said work receiving position, reciprocable means having a fixed path of movement between said loading and discharging position and a grinding position, for moving a work piece from said transfer device to said grinding position, said reciprocable means being operable at the end of a grinding operation to return said work piece to the loading and discharging position vacated by said transfer device.

7. The combination with a centerless grinder including opposed grinding and regulating wheels and an intermediate work rest, means including a transfer device for receiving work pieces from a supply thereof and for elevating same to a position in alignment with said work rest, a reciprocable means having a fixed path of movement between a loading and discharging position and a grinding position for receiving a work piece from said transfer device and for moving same along said work rest between said positions, said transfer device being actuated at the end of a grinding operation for descending to work receiving position leaving said loading and discharging position open, and means operable when said transfer device approaches its lower position for actuating said reciprocable means to return a finished work piece to said loading and discharging position.

WILLIAM E. HAPPEL.

REFERENCES CITED

The following references are of record in the file of this patent:

UNITED STATES PATENTS

| Number | Name | Date |
| --- | --- | --- |
| 714,175 | Haley | Nov. 25, 1902 |
| 1,847,466 | Binns | Mar. 1, 1932 |
| 2,260,843 | Strong | Oct. 28, 1941 |